(12) United States Patent  (10) Patent No.: US 9,148,856 B2
Wentink et al.  (45) Date of Patent: Sep. 29, 2015

(54) POWER SAVE WITH DATA FETCH TIME, WITH END OF DATA INDICATION, AND WITH MORE DATA ACKNOWLEDGEMENT

(71) Applicant: ALCOMM Incorporated, San Diego, CA (US)

(72) Inventors: Maarten Menzo Wentink, Naarden (NL); Hemanth Sampath, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/286,784

(22) Filed: May 23, 2014

(65) Prior Publication Data

US 2014/0254449 A1  Sep. 11, 2014

Related U.S. Application Data

(62) Division of application No. 13/566,908, filed on Aug. 3, 2012.

(60) Provisional application No. 61/533,560, filed on Sep. 12, 2011, provisional application No. 61/529,796, filed on Aug. 31, 2011.

(51) Int. Cl.
*G08C 17/00* (2006.01)
*H04W 52/02* (2009.01)
(Continued)

(52) U.S. Cl.
CPC ...... *H04W 52/0225* (2013.01); *H04W 28/0278* (2013.01); *H04W 52/0216* (2013.01); *H04W 52/0219* (2013.01); *H04W 52/0235* (2013.01); *Y02B 60/50* (2013.01)

(58) Field of Classification Search
CPC .............. H04W 52/0225; H04W 52/0216; H04W 52/0219; H04W 52/0235; H04W 28/0278; Y02B 60/50
See application file for complete search history.

(56) References Cited

U.S. PATENT DOCUMENTS 8,014,323 B2  9/2011  Wentink et al.
8,064,374 B2  11/2011  Kakani et al.
2004/0190467 A1  9/2004  Liu et al.
(Continued)

FOREIGN PATENT DOCUMENTS

EP  1589702 A1  10/2005
EP  1954078 A1  8/2008
(Continued)

OTHER PUBLICATIONS

European Search Report—EP14173601—Search Authority—The Hague—Jul. 28, 2014.
(Continued)

*Primary Examiner* — Clemence Han
(74) *Attorney, Agent, or Firm* — S. Hossain Beladi

(57) ABSTRACT

A particular method includes transmitting a fetch trigger frame from a station to an access point. The method includes entering a power save mode at the station until a determination at the station that a fetch time associated with the station has elapsed. The access point is configured to communicate with one or more other stations during the fetch time. The method further includes, in response to the determination, exiting the power save mode and receiving one or more data frames from the access point at the station after exiting the power save mode.

20 Claims, 13 Drawing Sheets

(51) Int. Cl.
*H04W 28/02* (2009.01)
*H04B 1/38* (2015.01)

(56) References Cited

U.S. PATENT DOCUMENTS

| | | |
|---|---|---|
| 2005/0135302 A1 | 6/2005 | Wang et al. |
| 2005/0237984 A1 | 10/2005 | Benveniste |
| 2005/0249227 A1* | 11/2005 | Wang et al. ............ 370/412 |
| 2007/0191052 A1 | 8/2007 | Kneckt et al. |
| 2007/0218860 A1 | 9/2007 | Wentink |
| 2007/0218939 A1 | 9/2007 | Lim et al. |
| 2007/0230418 A1 | 10/2007 | Takeuchi et al. |
| 2007/0281617 A1 | 12/2007 | Meylan et al. |
| 2008/0130603 A1 | 6/2008 | Wentink et al. |
| 2008/0144558 A1 | 6/2008 | Wentink |
| 2008/0182567 A1* | 7/2008 | Zhu et al. ............... 455/418 |
| 2008/0298290 A1 | 12/2008 | Wentink |
| 2009/0124301 A1 | 5/2009 | Raissinia |
| 2010/0008278 A1 | 1/2010 | Kone et al. |
| 2010/0029325 A1 | 2/2010 | Wang et al. |
| 2010/0165896 A1 | 7/2010 | Gong et al. |
| 2010/0165973 A1 | 7/2010 | Su et al. |
| 2010/0214942 A1 | 8/2010 | Du et al. |
| 2010/0238807 A1 | 9/2010 | Xhafa et al. |
| 2012/0106418 A1 | 5/2012 | Xhafa et al. |
| 2012/0263084 A1 | 10/2012 | Liu et al. |
| 2012/0263085 A1 | 10/2012 | Liu et al. |
| 2012/0263086 A1 | 10/2012 | Liu et al. |
| 2013/0010662 A1 | 1/2013 | Park |
| 2013/0051293 A1 | 2/2013 | Wentink et al. |
| 2014/0086131 A1 | 3/2014 | Seok |
| 2014/0177501 A1 | 6/2014 | Seok et al. |
| 2014/0254450 A1 | 9/2014 | Wentink et al. |

FOREIGN PATENT DOCUMENTS

| | | |
|---|---|---|
| JP | 2001103020 A | 4/2001 |
| JP | 2003173305 A | 6/2003 |
| JP | 2004247951 A | 9/2004 |
| WO | 0010353 A1 | 2/2000 |
| WO | 2009107916 A1 | 9/2009 |

OTHER PUBLICATIONS

IEEE 802.11-2007, "IEEE Standard for Information Technology—Telecommunications and Information Exchange Between Systems—Local and Metropolitan Area Networks—Specific Requirements", Part 11: Wireless LAN Medium Access Control (MAC) and Physical Layer (PHY) Specifications, (Jun. 12, 2007).

International Search Report and Written Opinion—PCT/US2012/050070—ISA/EPO—Jan. 28, 2013.

European Search Report—EP14173611—Search Authority—The Hague—Jul. 28, 2014.

European Search Report—EP14173624—Search Authority—The Hague—Aug. 8, 2014.

* cited by examiner

POWER SAVE WITH DATA FETCH TIME, WITH END OF DATA INDICATION, AND WITH MORE DATA ACKNOWLEDGEMENT

I. CROSS-REFERENCE TO RELATED APPLICATIONS

The present application is a divisional application of and claims priority to commonly owned patent application Ser. No. 13/566,908 filed Aug. 3, 2012, which claims priority from commonly owned U.S. Provisional Patent Application No. 61/529,796 filed Aug. 31, 2011 and U.S. Provisional Patent Application No. 61/533,560 filed Sep. 12, 2011, the contents of which are expressly incorporated herein by reference in their entirety.

II. FIELD

The present disclosure is generally related to power savings while retrieving buffered data from an access point.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Such devices may be configured to communicate data via a wireless network. For example, many devices are configured to operate according to an Institute of Electrical and Electronics Engineers (IEEE) 802.11 specification that enables wireless exchange of data via an access point. Many communication devices are configured to enter a power save mode, during which time the communication device may shut down one or more components, thereby conserving power. While utilization of this power save mode may provide power conservation, problems may arise in determining when the communication device should resume normal operation and/or when the communication device should enter the power save mode.

IV. SUMMARY

In particular embodiment, a method includes receiving a power save polling (PS-Poll) frame from a station at an access point. The method also includes, in response to receiving the power save polling frame, transmitting a frame from the access point to the station indicating whether traffic associated with the station is buffered at the access point. For example, the frame may include an acknowledgement (ACK) transmitted a short interframe space (SIFS) after receipt of the power save polling frame. A particular bit (e.g., a more data (MD) bit) in a media access control (MAC) header of the frame may be used to indicate whether or not buffered traffic is pending.

In another particular embodiment, a method includes transmitting a power save polling frame from a station to an access point. The method also includes, in response to transmitting the power save polling frame, receiving a frame from the access point indicating whether traffic associated with the station is buffered at the access point.

In another particular embodiment, a method includes receiving a first frame from a station at an access point, the first frame indicating that the station is to enter a power save mode. The method also includes transmitting one or more data frames from the access point to the station, where the one or more data frames were buffered for transmission prior to receipt of the first frame. The method further includes transmitting an end of data frame to the station.

In another particular embodiment, a method includes transmitting a first frame from a station to an access point indicating that the station is to enter a power save mode. The method also includes refraining from entering the power save mode until an end of data frame is received from the access point. The method further includes entering the power save mode at the station in response to receiving the end of data frame from the access point. For example, the end of data frame may be an end of data indication (EODI). Alternately, the end of data frame may be a frame that includes a MAC header having an asserted end of service period (EOSP) bit.

In another particular embodiment, a method includes receiving a fetch trigger frame from a station at an access point. The method also includes fetching one or more data frames associated with the station in response to the fetch trigger frame. The method further includes refraining from transmitting the one or more fetched data frames to the station until a delivery condition associated with the station is satisfied. For example, the delivery condition may be satisfied when the access point determines that a predetermined fetch time has elapsed or that a delivery trigger frame has been received from the station. The predetermined fetch time may be indicated by the station in the fetch trigger frame or may be indicated by the access point in an ACK response to the fetch trigger frame. During the fetch time, the station may enter a power saving (e.g., low power) state. The access point may communicate with one or more other stations during the fetch time.

In another particular embodiment, a method includes transmitting a fetch trigger frame from a station to an access point. The method also includes entering a power save mode at the station until a determination at the station that a fetch time associated with the station has elapsed, where the access point is configured to communicate with one or more other stations during the fetch time. The method further includes in response to the determination, exiting the power save mode and receiving one or more data frames from the access point at the station after exiting the power save mode.

One particular advantage provided by at least one of the disclosed embodiments is reduced power consumption and increased signaling efficiency between stations and access points in a wireless network. For example, the disclosed embodiments may enable stations to remain in a power save state for a predetermined fetch time. As another example, the disclosed embodiments may enable transmission of previously buffered data packets to a station even after the station has indicated a future transition to a power save state, so that such packets do not have to be re-fetched and re-buffered when the station exits the power save state. Reducing the number of packets that are re-fetched and re-buffered may increase throughput of the wireless network.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
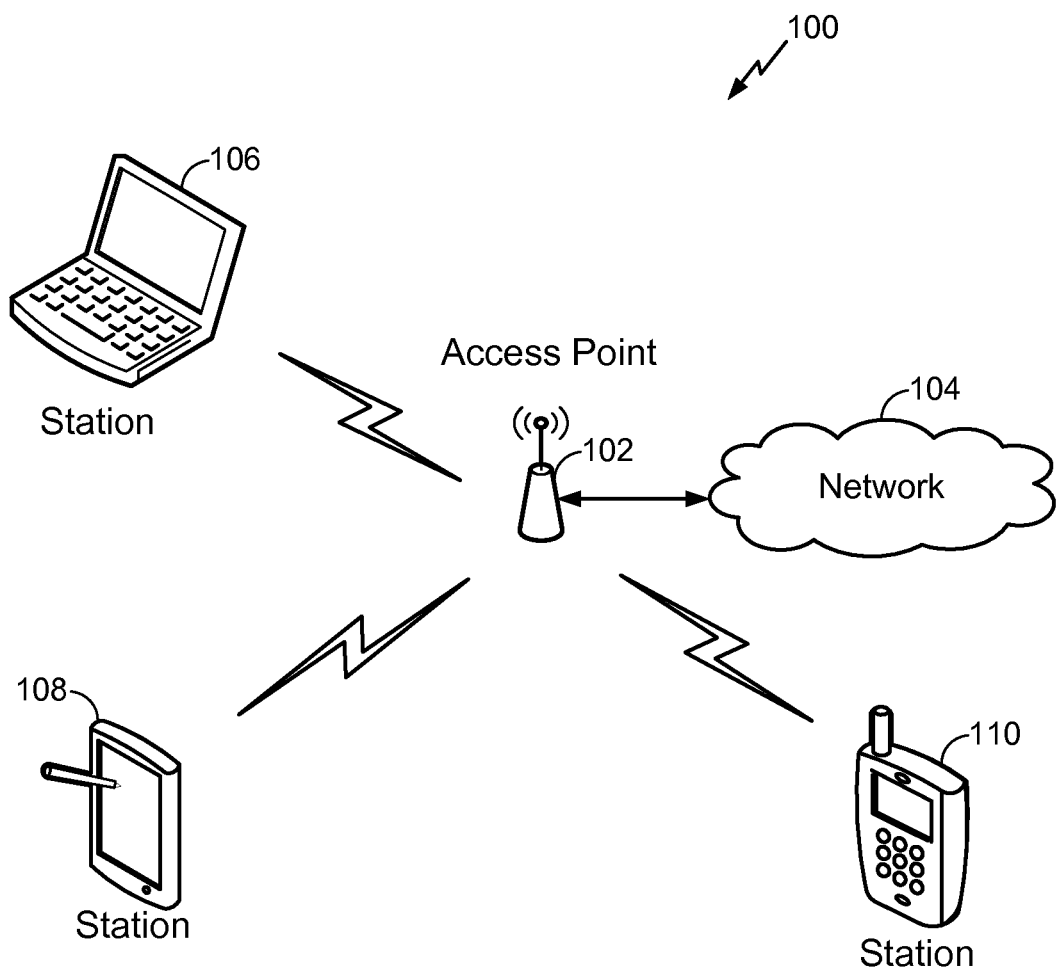
FIG. 1 is a diagram of a particular illustrative embodiment of a network configuration for communicating data between one or more stations and an access point.

Referring to FIG. 1, a particular embodiment of a network configuration for communicating data between one or more stations and an access point is depicted and generally designated 100. The network configuration 100 includes an access point 102 coupled to a network 104. The access point 102 may be configured to provide wireless communications to various communication devices such as wireless devices (e.g., stations 106, 108, 110). The access point 102 may be a base station. The stations 106, 108, 110 may be a personal computer (PC), a laptop computer, a tablet computer, a mobile phone, a personal digital assistant (PDA), and/or any device configured for wirelessly sending and/or receiving data, or any combination thereof. The network 104 may include a distributed computer network, such as a transmission control protocol/internet protocol (TCP/IP) network.

The access point 102 may be configured to provide a variety of wireless communications services, including but not limited to: Wireless Fidelity (WIFI) services, Worldwide Interoperability for Microwave Access (WiMAX) services, and wireless session initiation protocol (SIP) services. The stations 106, 108, 110 may be configured for wireless communications (including, but not limited to communications in compliance with the 802.11, 802.11-2007, and 802.11x family of specifications developed by the Institute of Electrical and Electronics Engineers (IEEE)). In addition, the stations 106, 108, 110 may be configured to send data to and receive data from the access point 102. In an illustrative embodiment, the access point 102 and the stations 106-110 may communicate via a sub-1 GHz wireless network (e.g., a wireless network configured in accordance with an IEEE 802.11ah specification, standard, and/or protocol).

The stations 106, 108, 110 may be configured to enter a power save mode to conserve power and extend battery life when operating in a mode that does not involve sending data to or receiving data from the access point 102. For example, the power save mode may be entered by a station either upon initiation by a user or after expiration of a period of sufficient inactivity. In the power save mode, the amount of power consumed by the station is reduced as compared to the amount of power used during normal operation. While a particular station is in the power save mode, the access point 102 buffers data intended for delivery to the particular station. However, problems may arise in determining when the stations should resume normal operation from the power save mode to send and receive communications data.

For example, it may take the access point 102 considerable time to retrieve the buffered data. During this time, a particular station typically waits for the access point 102 to retrieve the buffered data and stays in the "wake" state, which consumes power. One solution may be to introduce a defined fetch time between an initial request for buffered traffic and the earliest delivery of the buffered traffic so that the station may "sleep" during the defined fetch time, thereby conserving power.

Figure 2:
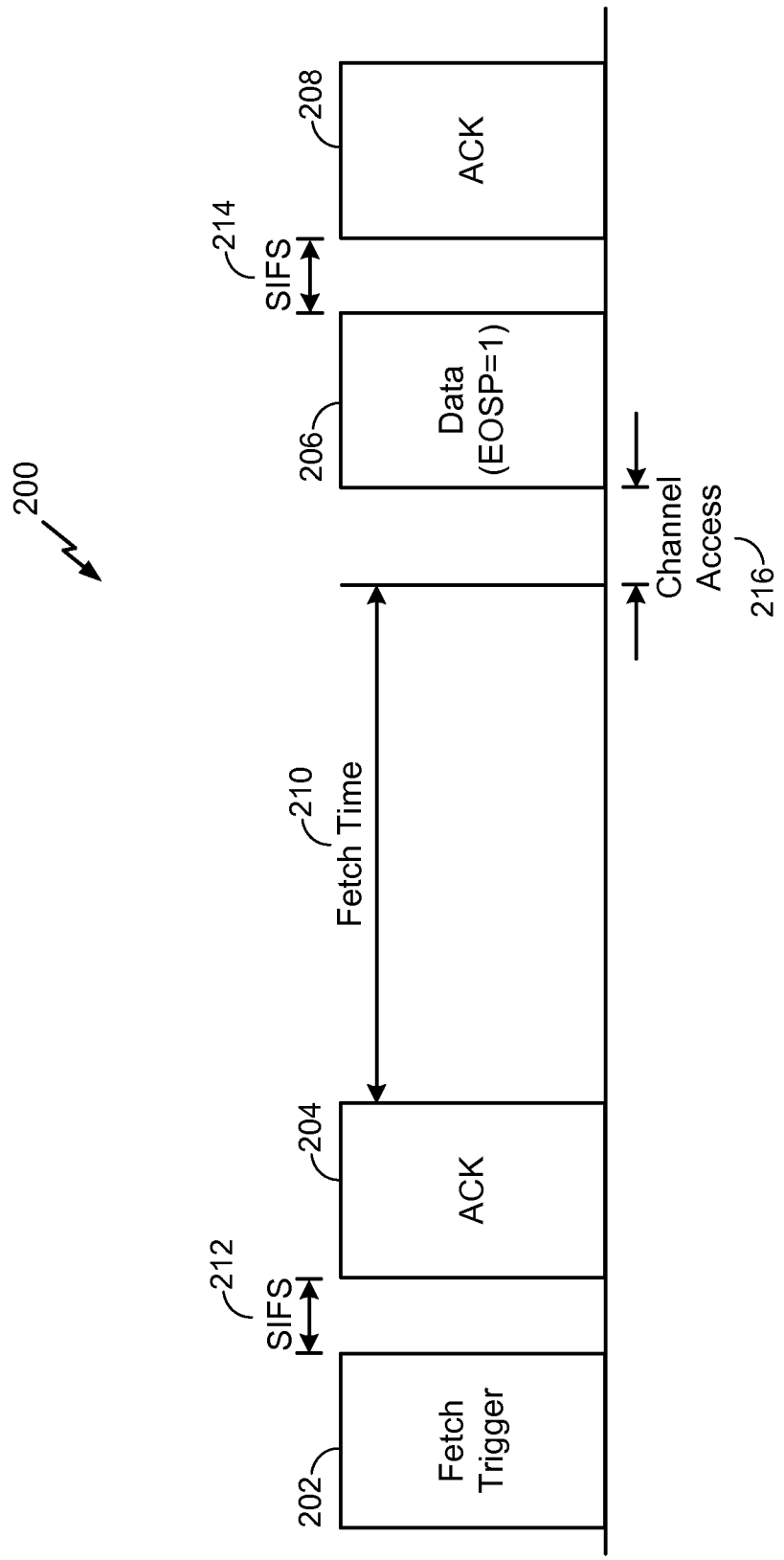
FIG. 2 is a diagram of a first illustrative embodiment of data frames that may be sent between a station and an access point using a defined fetch time between an initial request for buffered traffic and the delivery of the buffered traffic.

Referring to FIG. 2, a first illustrative embodiment of data frames that may be sent between a station, such as one or more of the stations 106, 108, 110 of FIG. 1, and an access point, such as the access point 102 of FIG. 1, using a defined fetch time between an initial request for buffered traffic (at a first time) and the delivery of the buffered traffic (at a second time), is depicted and generally designated 200. The data frames include a fetch trigger frame 202, a first acknowledgement (ACK) frame 204, a data frame 206, and a second ACK frame 208. A fetch time 210, a first short interframe space (SIFS) 212, a second SIFS 214, and a channel access 216 are associated with transmissions of the data frames 200.

In a particular embodiment, the fetch time 210 can be timed off of the fetch trigger frame 202, which triggers the access point 102 to fetch the buffered data. In a particular embodiment, the fetch trigger frame 202 may be a power save poll (PS-Poll) frame or an unscheduled asynchronous power save delivery (U-APSD) trigger frame that may be modified to include the fetch time 210. For example, the fetch time 210 may be included in the fetch trigger frame 202, included in a response (e.g., the ACK frame 204) to the fetch trigger frame 202, or advertised by the access point 102 in a beacon or other frame directed at a particular station. After the receipt of the fetch trigger frame 202, the access point 102 does not send the fetched data to the station until after the end of the fetch time 210.

To illustrate, one of the stations 106, 108, 110, such as the station 106, may send a request for data buffered at the access point 102. It should be noted that the station 106 is used for example only, and that the communications illustrated in FIGS. 2-6 may occur with respect to any of the stations 106-110 or other stations not shown. Fetching the buffered data may start once the access point 102 receives the fetch trigger frame 202. The ACK frame 204 may be sent by the access point 102 to the station 106 to acknowledge receipt of the fetch trigger frame 202. The delivery of the fetched data from the access point 102 to the station 106 may start after a known delay, such as the fetch time 210, after receipt of the fetch trigger frame 202. The station 106 may enter a power save mode (e.g. a sleep mode) during the known delay or fetch time 210, and only needs to be awake (e.g., transition from the sleep mode to an operating mode) when the fetched data is delivered or ready to be delivered. The fetch time may be timed based on the ACK frame 204 or on the fetch trigger frame 202.

For example, the station 106 may send the fetch trigger frame 202 to the access point 102. The access point 102 may fetch buffered data during the fetch time 210. Frames may be sent by the access point 102 to the other stations 108, 110 during the fetch time 210, but not to the station 106. The station 106 may "sleep" during the fetch time 210 (e.g., until a determination at the station 106 that the fetch time has elapsed, such as upon expiration of a timer at the station 106). The access point 102 may refrain from transmitting the fetched data to the station 106 until determining, at the access point 102, that the fetch time 210 has elapsed. For example, the access point 102 may measure the fetch time 210 using a timer and may refrain from transmitting the fetched data to the station 106 until the timer expires. Alternately, the access point 102 may refrain from transmitting the fetched data to the station 106 until a delivery trigger frame is received, as further described with reference to FIG. 3. However, in contrast to network allocation vector (NAV)-based mechanisms that prevent communication by any device during the NAV time period, the access point 102 may have the ability to communicate with other stations during the fetch time 210. For example, the access point 102 may send and receive data frames and/or control frames from other associated stations during the fetch time 210. After the fetch time 210 (and after a time 216 for channel access), the data frame 206 may be sent by the access point 102 to the station 106. The channel access time 216 may coincide with the end of the fetch time 210. End of service period (EOSP) signaling may be used to indicate that no further traffic is buffered at the access point 102 and that the station 106 can go back to the sleep state. For example, an EOSP bit having a value of "1" may be included in a media access control (MAC) header of the data frame 206, indicating that no further traffic is buffered at the access point 102. After receiving the data frame 206 from the access point 102, the station 106 may send the second ACK frame 208 to the access point 102 to acknowledge receipt of the data frame 206. The station 106 may sleep after receipt of the data frame 206.

Figure 3:
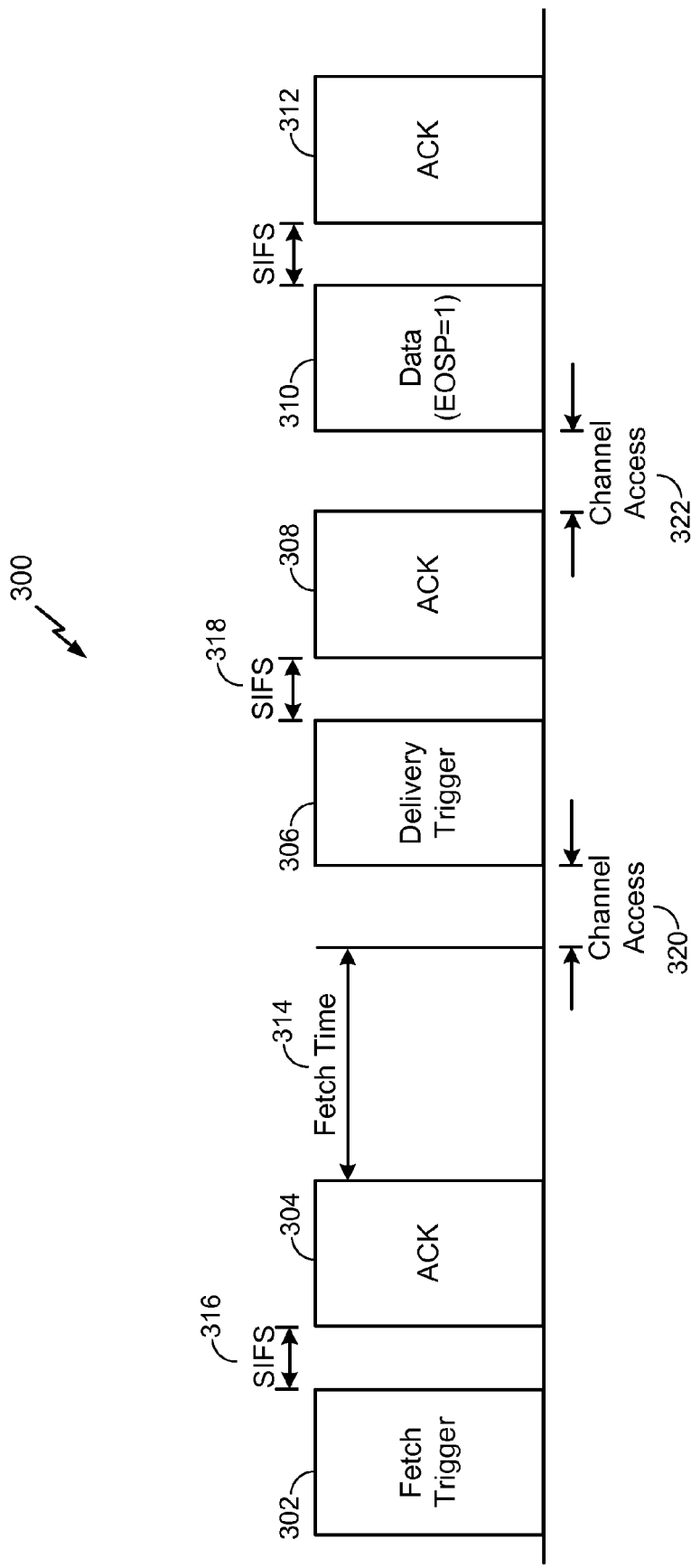
FIG. 3 is a diagram of a second illustrative embodiment of data frames that may be sent between a station and an access point using a fetch trigger frame and a delivery trigger frame.

Referring to FIG. 3, a second illustrative embodiment of data frames that may be sent between a station, such as one or more of the stations 106, 108, 110 of FIG. 1, and an access point, such as the access point 102 of FIG. 1, using a fetch trigger frame and a delivery trigger frame to define a fetch time between an initial request for buffered traffic and the delivery of the buffered traffic, are depicted and generally designated 300. The data frames 300 include a fetch trigger frame 302, a first acknowledgement (ACK) frame 304, a delivery trigger frame 306, a second ACK frame 308, a data frame 310, and a third ACK frame 312. A fetch time 314, a first short interframe space (SIFS) 316, a second SIFS 318, a first channel access 320, and a second channel access 322 are associated with transmissions of the data frames 300.

In a particular embodiment, the access point 102 starts to fetch data buffered at the access point 102 after receiving the fetch trigger frame 302 from a particular station, such as the station 106. The access point 102 may refrain from transmitting the fetched data to the station 106 until determining that the delivery trigger frame 306 has been received from the station 106. However, in contrast to network allocation vector (NAV)-based mechanisms that prevent communication by any device during the NAV time period, the access point 102 may have the ability to communicate with other stations during the fetch time 210. The access point 102 delivers the fetched data to the station 106 after receiving the delivery trigger frame 306 from the station 106. The station 106 stays awake after sending the delivery trigger frame 306 until the station 106 receives the data frame 310 from the access point 102.

The delivery trigger frame 306 may be a newly defined frame, an unscheduled asynchronous power save delivery (U-APSD) trigger frame, or a power save poll (PS-Poll) frame. The fetch trigger frame 302 may be a newly defined frame, an unscheduled asynchronous power save delivery (U-APSD) trigger frame, or a power save poll (PS-Poll) frame. The fetch or delivery trigger aspect may be signaled through fields in existing frames.

A reset interval may be defined beyond which the fetched data is returned to the access point's power save buffer, when no delivery trigger frame is received.

A minimum fetch time may be indicated by the access point 102, in a beacon, a probe response, an association response, or in a specific action frame. The actual fetch time may be programmed at the access point or by the particular station. To illustrate, the station 106 may send a request for data buffered at the access point 102. Fetching the buffered data may start after the access point 102 receives the fetch trigger frame 302. The ACK frame 304 may be sent by the access point 102 to the station 106 to acknowledge receipt of the fetch trigger frame 302. The delivery of the fetched data from the access point 102 to the station 106 starts after receipt by the access point 102 of the delivery trigger 306 from the station 106. The second ACK frame 308 may be sent by the access point 102 to the station 106 to acknowledge receipt of the delivery trigger 306. The station 106 stays awake after sending the delivery trigger 306 to the access point 102 until the station 106 receives the data frame 310 from the access point 102.

For example, the station 106 may send the fetch trigger frame 302 to the access point 102. The access point 102 may fetch data that is buffered at the access point 102 during the fetch time 314 after receipt of the delivery trigger 306. Frames may be sent by the access point 102 to the other stations 108, 110 during the fetch time 314 but not to the station 106. The station 106 may "sleep" during the fetch time 314, thereby saving power. The data frame 310 may be sent by the access point 102 to the station 106 after the access point 102 receives the delivery trigger 306. An end of service period (EOSP) signaling may be used to indicate that no further traffic is buffered at the access point 102 and that the station 106 can go back to the sleep state. After receiving the data frame 310, the station 106 may send the third ACK frame 312 to the access point 102 to acknowledge receipt of the data frame 310. The station 106 may sleep after receiving the data frame 310 (e.g., upon detection of the EOSP).

Thus, as illustrated with reference to FIGS. 2-3, an access point may refrain from transmitting data frames to a station until a delivery condition is satisfied. The delivery condition may be satisfied upon expiration of the predetermined fetch time 210 of FIG. 2 or upon receipt of the delivery trigger packet 306 of FIG. 3. Similarly, the station may not exit a power save mode until a wake condition is satisfied. The wake condition may be satisfied upon expiration of the predetermined fetch time 210 of FIG. 2 or the fetch time 314 prior to transmission of the delivery trigger packet 306 of FIG. 3.

Figure 4:
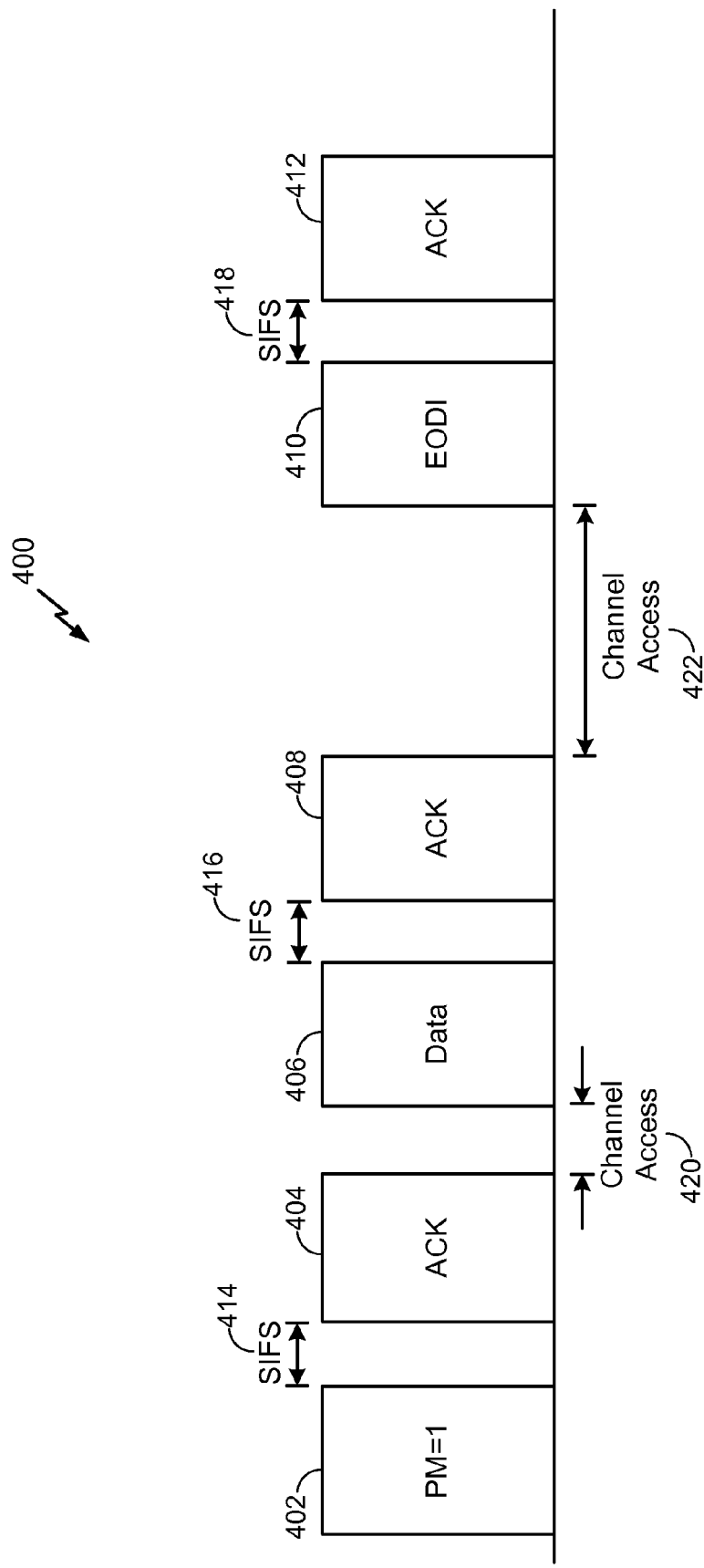
FIG. 4 is a diagram of a third illustrative embodiment of data frames that may be sent between a station and an access point using an end of data indication frame.

Referring to FIG. 4, a third illustrative embodiment of data frames that may be sent between a station, such as one or more of the stations 106, 108, 110 of FIG. 1, and an access point, such as the access point 102 of FIG. 1, using an end of data indication frame, is depicted and generally designated 400. The data frames 400 include a power management frame 402 including a power management bit, a first acknowledgement (ACK) frame 404, a data frame 406, a second ACK frame 408, an end of data indication (EODI) frame 410, and a third ACK frame 412. A first short interframe space (SIFS) 414, a second SIFS 416, a third SIFS 418, a first channel access 420, and a second channel access 422 are associated with transmissions of the data frames 400.

The access point 102 may discard several pending frames for a particular station, such as the station 106, when the particular station enters a power save mode because the access point 102 may have scheduled such frames for transmission and may not have the capability to pull them back from a transmission queue and store them as buffered frames.

In a particular embodiment, the EODI frame 410 may be scheduled for transmission by the access point 102 when the station 106 is to enter a power save mode. After scheduling the EODI frame 410, the access point 102 may buffer further traffic destined for the station 106 so that the EODI frame 410 is the last frame sent to the station 106 after it entered the power save mode. The station 106 may refrain from entering the power save mode (e.g., may delay going to sleep) after indicating its pending transition to the power save mode until the station receives the EODI frame 410.

For example, the station 106 may indicate that it is to enter the power save mode by sending the power management frame 402 to the access point 102. For example, the power management (PM) bit may have a value of "1" to indicate that the station 106 is to enter the power save mode. The PM bit on a prior frame sent by the station 106 to the access point 102 may have had a value of 0, indicating that the station 106 was in active mode. In response to receiving the power management frame 402, the access point 102 may schedule the EODI frame 410 for the station 106. The first ACK frame 404 may be sent by the access point 102 to the station 106 to acknowledge receipt of the power management frame 402. As explained above, the access point 102 continues to send data which had already been prepared for transmission at the time the power management frame 402 is received from the station 106, and the station 106 continues to remain awake and receive the data from the access point 102. To illustrate, the access point 102 continues to send the data, such as the data frame 406, to the station 106. The station 106 stays awake and receives the data until it receives the EODI frame 410 from the access point 102. The second ACK frame 408 may be sent by the station 106 to the access point 102 to acknowledge receipt by the station 106 of the data frame 406. The third ACK frame 412 may be sent by the station 106 to the access point 102 to acknowledge receipt of the EODI frame 410. The station 106 may sleep after receiving the EODI frame 410. The access point 102 sends no data to the station 106 after the access point 102 sends the EODI frame 410 to the station 106.

Alternatively, the end of data indication may be a bit inside the media access control (MAC) header. For example, the end of data indication may be an end of service period (EOSP) bit, and the access point 102 may set the EOSP bit=1 on a final frame sent to a particular station after the particular station indicates a transition to the power save mode. Thus, the frame that is used to enter power save mode may also trigger a service period that is terminated with a frame with the EOSP bit set to 1.

Figure 5:
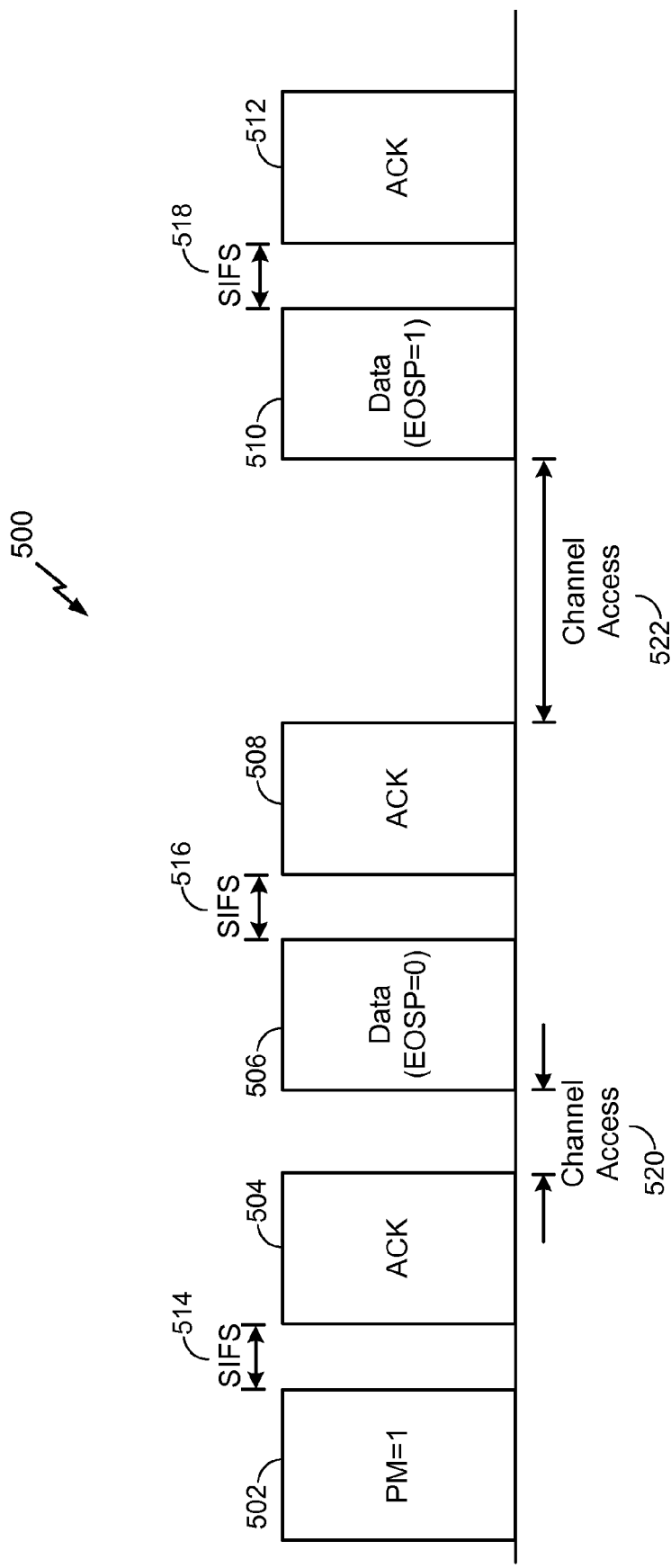
FIG. 5 is a diagram of a fourth illustrative embodiment of data frames that may be sent between a station and an access point using a media access control header having an end of service period bit as an end of data indication.

For example, referring to FIG. 5, a fourth illustrative embodiment of data frames that may be sent between a station, such as one or more of the stations 106, 108, 110 of FIG. 1, and an access point, such as the access point 102 of FIG. 1, using a bit inside a media access control header as an end of data indication, is depicted and generally designated 500. The data frames 500 include a power management frame 502 including a power management bit, a first acknowledgement (ACK) frame 504, a first data frame 506 including an end of service period (EOSP) bit, a second ACK frame 508, a second data frame 510 including an end of service period (EOSP) bit, and a third ACK frame 512. A first short interframe space (SIFS) 514, a second SIFS 516, a third SIFS 518, a first channel access 520, and a second channel access 522 are associated with transmissions of the data frames 500.

A station, such as the station 106, may enter the power save mode by sending the power management frame 502 to the access point 102. For example, a power management (PM) bit within the power management frame 502 may have a value of "1" to indicate that the station 106 is entering the power save mode. At the time power management frame 502 is sent to the access point 102, the access point 102 may have queued the data frame 506 and the data frame 510 for transmission to the station 106. The access point 102 may send the second data frame 510 with the EOSP bit=1 because the second data frame 510 is the final frame to the station 106. In a particular embodiment, the final frame with the EOSP=1 may be a newly scheduled frame that is scheduled in response to the access point 102 receiving the power management frame 502 with the PM bit=1, similar to the EODI frame described above. The first ACK frame 504 may be sent by the access point 102 to the station 106 to acknowledge receipt of the power management frame 502. As explained above, the access point 102 continues to send data that had already been prepared at the time the power management frame 502 with the PM bit=1 is received from the station 106 until access point 102 sends the second data frame 510 with the EOSP bit=1.

To illustrate, the access point 102 continues to send data, such as the first data frame 506, to the station 106. The station 106 stays awake until it receives the second data frame 510 with the EOSP bit=1 from the access point 102. The second ACK frame 508 may be sent by the station 106 to the access point 102 to acknowledge receipt of the first data frame 506 with the EOSP bit=0 (e.g., the EOSP bit=0 indicates that the data frame is not the final frame to be sent). The third ACK frame 512 may be sent by the station 106 to the access point 102 to acknowledge receipt of the second data frame 510 with the EOSP bit=1. The station 106 may sleep after receiving the second data frame 510 with the EOSP bit=1. The access point 102 stops sending data to the station 106 after the access point 102 sends the second data frame 510 with the EOSP bit=1 to the station 106. Alternatively, in response to the station 106 indicating a pending transition to the power save mode by sending the power management frame 502 with the PM bit=1, the station 106 may implicitly start an unscheduled service period, which may be terminated by the access point 102 sending the second data frame 510 with the EOSP bit=1 to the station 106.

A particular station that is in the power save mode may periodically check for the presence of traffic buffered at an access point by sending a power save poll (PS-Poll) frame. The access point may respond with an acknowledgement (ACK) frame, followed after some time by a null frame that indicates that no data is pending for the station, in response to which the station sends an acknowledgement frame. These frame exchanges and the corresponding delay may cause power consumption inefficiency at the station.

In response to no traffic being buffered at the access point destined for the particular station, the access point may respond to the PS-Poll frame with a short frame that indicates that no data is currently pending for the particular station. The response frame could be an ACK frame in which a more data (MD) bit indicates whether traffic is buffered for the particular station or not. For example, a value of "1" in the MD bit may indicate that traffic is buffered, and a value of "0" in the MD bit may indicate that no traffic is buffered. Alternatively, a value of "0" in the MD bit may indicate that traffic is buffered, and a value of "1" in the MD bit may indicate that no traffic is buffered. The access point may base the determination that traffic is buffered for the particular station on a traffic indication map (TIM) that is stored in a lower portion of the medium access coordinator. The station's association identifier (AID) that is present in the PS-Poll frame may serve as an offset into the TIM in order to quickly determine whether buffered frames are present for the station.

Figure 6:
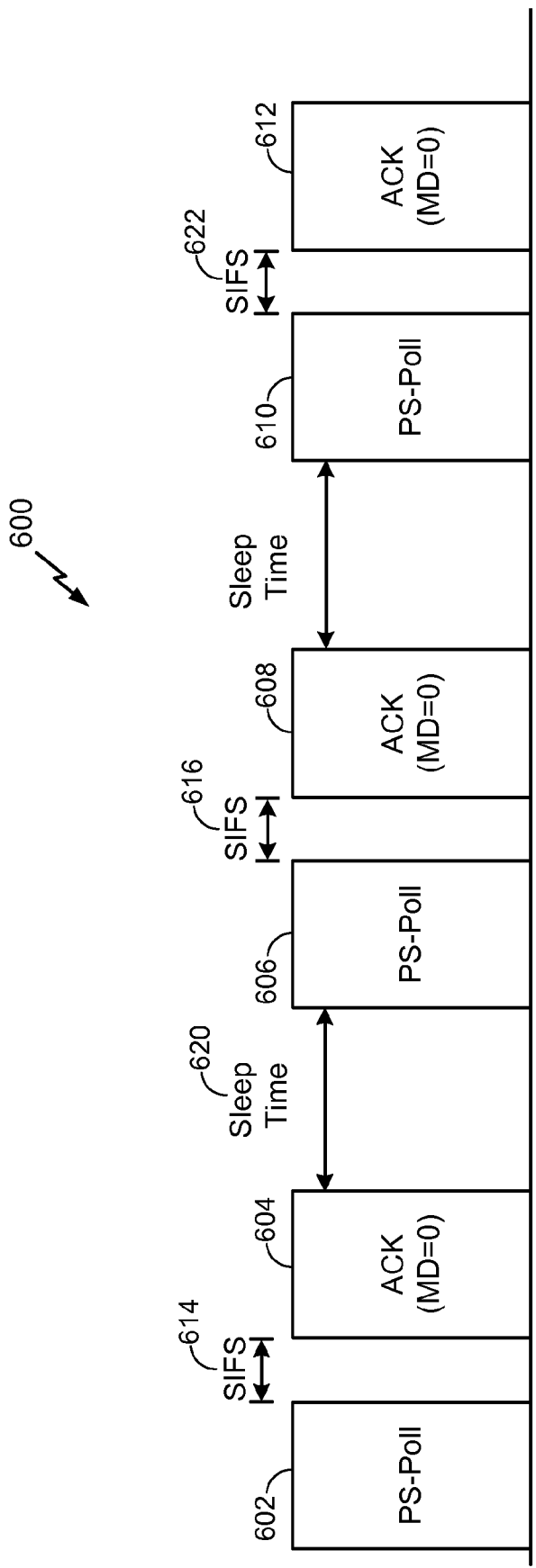
FIG. 6 is a diagram of a fifth illustrative embodiment of data frames that may be sent between a station and an access point using a short frame that indicates that no data is currently pending for the station.

Referring to FIG. 6, a fifth illustrative embodiment of data frames that may be sent between a station, such as one or more of the stations 106, 108, 110 of FIG. 1, and an access point, such as the access point 102 of FIG. 1, using a short frame that indicates that no data is currently pending for the station, is depicted and generally designated 600. The data frames 600 include a first power save poll (PS-Poll) frame 602, a first acknowledgement (ACK) frame 604, a second PS-Poll frame 606, a second ACK frame 608, a third PS-Poll frame 610, and a third ACK frame 612. A first short interframe space (SIFS) 614, a second SIFS 616, a third SIFS 618, a first station sleep time 620, and a second station sleep time 622 are associated with transmissions of the data frames 600.

In a particular embodiment, the station 106 may periodically send a PS-Poll frame, such as the first PS-Poll frame 602, to the access point 102 to check for the presence of buffered traffic at the access point 102. In response to no traffic being buffered at the access point 102 for the station 106, the access point 102 may respond with the first ACK frame 604. The first ACK frame 604 may indicate whether traffic associated with the station 106 (e.g., traffic buffered for the station 106) is present. For example, as illustrated in FIG. 6, the access point 102 may send the first ACK frame 604 with the more data bit=0, indicating that traffic associated with the station is not currently buffered at the access point 102. In a particular embodiment, the first ACK frame 604 may be sent after the first SIFS 614 after the first PS-Poll frame 602. The first SIFS 614 is typically too short a timeframe for the access point 102 to fetch buffered traffic. However, the first SIFS 614 may be a sufficient timeframe to check whether or not traffic is buffered. Information about the presence of buffered traffic is broadcast by the access point 102 in a traffic indication map (TIM), and the information from the TIM can be buffered at a low layer in the medium access coordinator, where a quick check can be performed to determine whether traffic is pending for the station 106 or not. Alternatively, other bits or fields in the MAC header of a response frame may be used to indicate the presence of buffered traffic. The station 106 may sleep in response to receiving the first ACK frame 604 until the second PS-Poll frame 606 is sent.

For example, the station 106 may sleep until sending the second PS-Poll frame 606 to the access point 102 to check for the presence of buffered traffic. In response to no traffic being buffered by the access point 102 for the station 106, the access point 102 may respond to the second PS-Poll frame 606 with the second ACK frame 608 with the more data (MD) bit=0. The second ACK frame 608 may be sent after the second SIFS 616 after the second PS-Poll frame 606. Alternately, if the station 106 receives an ACK frame with MD=1, the station 106 may remain awake to receive one or more data frames from the access point 102.

Figure 7:
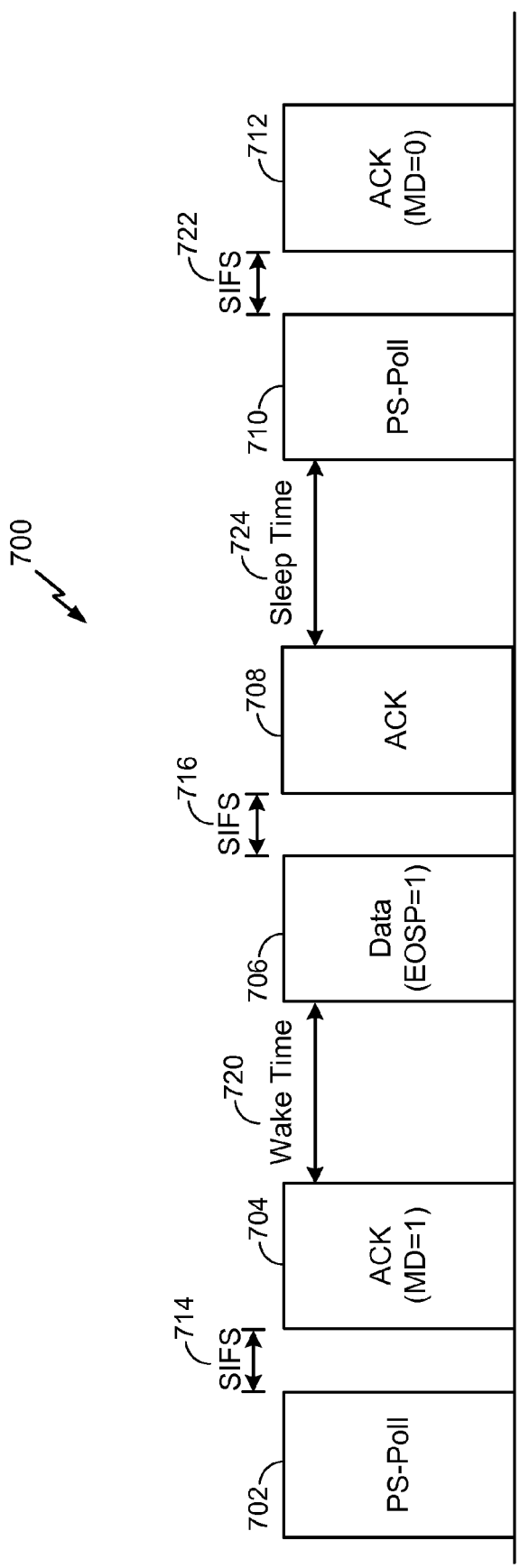
FIG. 7 is a diagram of a sixth illustrative embodiment of data frames that may be sent between a station and an access point using a short frame that indicates that data is currently pending for the station.

To illustrate, referring to FIG. 7, a sixth illustrative embodiment of data frames that may be sent between a station, such as one or more of the stations 106, 108, 110 of FIG. 1, and an access point, such as the access point 102 of FIG. 1, using a short frame that indicates that data is currently pending for the station, is depicted and generally designated 700. The data frames 700 include a first power save poll (PS-Poll) frame 702, a first acknowledgement (ACK) frame 704, a data frame 706, a second ACK frame 708, a second PS-Poll frame 710, and a third ACK frame 712. A first short interframe space (SIFS) 714, a second SIFS 716, a third SIFS 722, a station wake time 720, and a station sleep time 724 are associated with transmissions of the data frames 700.

In a particular embodiment, the station 106 may periodically send a PS-Poll frame, such as the first PS-Poll frame 702, to the access point 102 to check for the presence of buffered traffic at the access point 102. In response to traffic being buffered at the access point 102 for the station 106, the access point 102 may respond with the first ACK frame 704. The first ACK frame 704 may indicate whether traffic associated with the station 106 (e.g., traffic buffered for the station 106) is present. For example, as illustrated in FIG. 7, the access point 102 may send the first ACK frame 704 with the more data bit=1, effectively starting a service period and indicating that traffic associated with the station is currently buffered at the access point 102. In a particular embodiment, the first ACK frame 704 may be sent after the first SIFS 714 after the first PS-Poll frame 702. The station 106 may stay awake until it receives a frame from the access point 102 indicating that no further traffic is buffered at the access point 102. For example, end of service period (EOSP) signaling may be used to indicate that no further traffic is buffered at the access point 102 and that the station 106 can go back to the sleep state. For example, an EOSP bit having a value of "1" may be included in a media access control (MAC) header of the data frame 706, indicating that no further traffic is buffered at the access point 102. After receiving the data frame 706 from the access point 102, the station 106 may send the second ACK frame 708 to the access point 102 to acknowledge receipt of the data frame 706. The station 106 may enter a sleep mode after receipt of the data frame 706 until the second PS-Poll frame 710 is sent.

For example, the station 106 may sleep until sending the second PS-Poll frame 710 to the access point 102 to check for the presence of buffered traffic. In response to no traffic being buffered by the access point 102 for the station 106, the access point 102 may respond to the second PS-Poll frame 710 with the third ACK frame 712 with the more data bit=0. The third ACK frame 712 may be sent after the third SIFS 722 after the second PS-Poll frame 710.

In a particular embodiment, to save power, the station 106 may wake up only to poll the access point 102 to determine whether or not buffered data is available. However, in this embodiment, the station 106 may miss receiving critical network update information from the access point 102. Such changes may affect an operating mode of a base station system associated with the station 106 and the access point 102. For example, the station 106 may be in a power save mode (i.e., sleeping) when the access point 102 transmits beacon update information to stations within range of the access point 102. To reduce or minimize such scenarios, an acknowledge frame from the access point 102 may include an updated beacon version number (BVN) that is used by the station 106 to determine whether it should wake up to receive a beacon or to solicit a probe response by sending a probe request to the access point 102.

Figure 8:
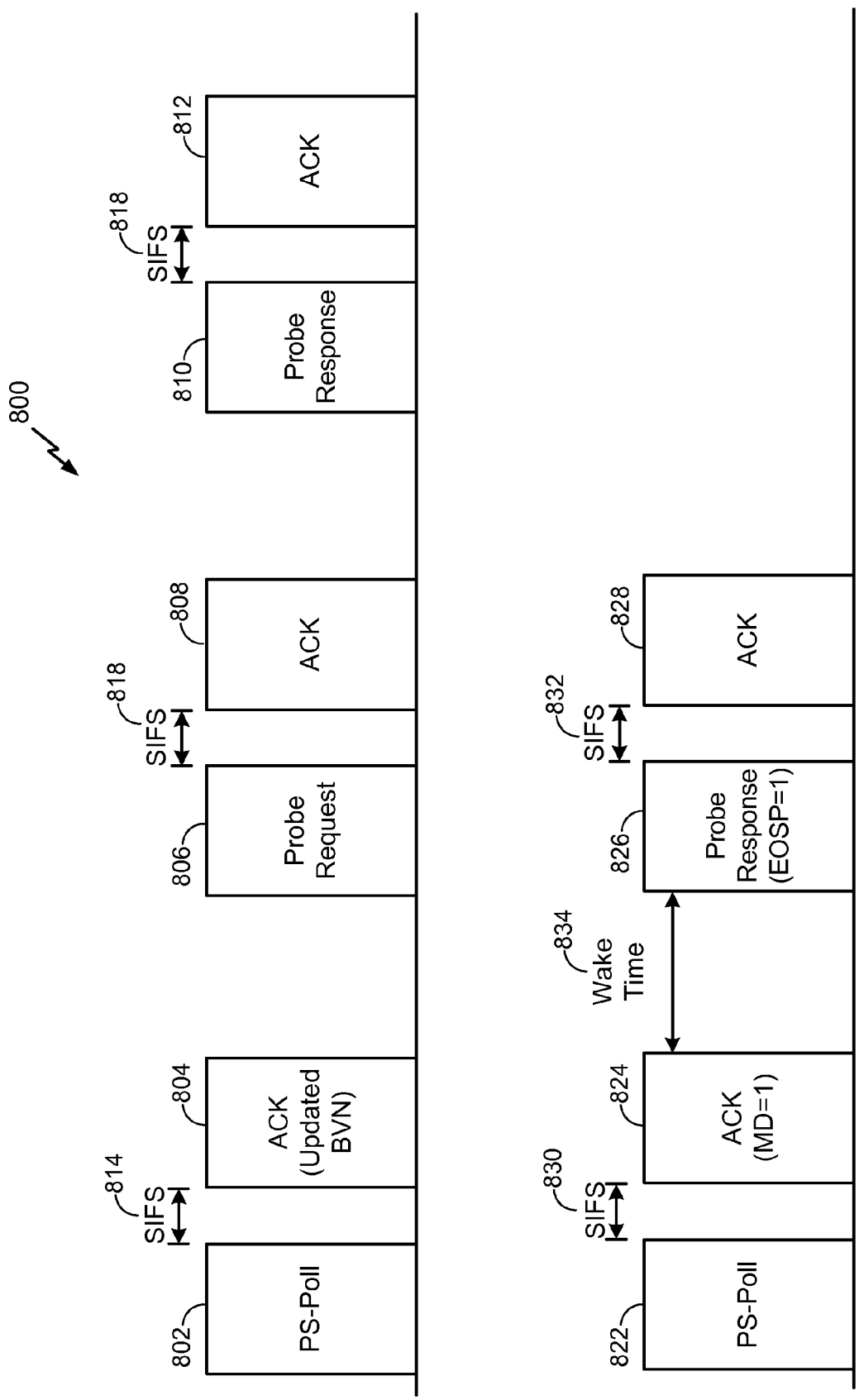
FIG. 8 is a diagram of a seventh illustrative embodiment of data frames that may be sent between a station and an access point using a short frame that indicates that data is currently pending for the station.

To illustrate, referring to FIG. 8, a seventh illustrative embodiment of data frames that may be sent between a station, such as one or more of the stations 106, 108, 110 of FIG. 1, and an access point, such as the access point 102 of FIG. 1, using a short frame that indicates that data is currently pending for the station, is depicted and generally designated 800. The data frames 800 include a first power save poll (PS-Poll) frame 802, a first acknowledgement (ACK) frame 804, a first probe request frame 806, a second ACK frame 808, a probe response frame 810, a third ACK frame 812, a second PS-Poll frame 822, a fourth ACK frame 824, a second probe response frame 826, and a fifth ACK frame 828. A first short interframe space (SIFS) 814, a second SIFS 816, a third SIFS 818, a fourth SIFS 830, a fifth SIFS 832, and a wake time 834 are associated with transmissions of the data frames 800.

In a particular embodiment, the access point 102 updates the beacon version number when a significant change occurs in the beacon which needs to be parsed by all stations in a base station system. Such a change may include a change to channel access parameters through an enhanced distributed channel access parameter set or a change in an operating bandwidth at the access point 102. To illustrate, the station 106 notes that the beacon version number (BVN) has been updated, after which the station 106 solicits a probe response frame by sending a probe request frame to the access point 102. For example, the station 106 may periodically send a PS-Poll frame, such as the first PS-Poll frame 802, to the access point 102 to check for the presence of buffered traffic at the access point 102. The access point 102 may respond with the first ACK frame 804. The first ACK frame 804 may indicate that the BVN has been updated. For example, as illustrated in FIG. 8, the access point 102 may send the first ACK frame 804 including an updated BVN. In response to receiving the first ACK frame 804, the station 106 may solicit the probe response frame 810 by sending the probe request 806 to the access point 102. The second ACK frame 808 may be sent by the access point 102 to the station 106 to acknowledge receipt of the probe request 806. The access point 102 may send the probe response 810 to the station 106. The third ACK frame 812 may be sent by the station 106 to the access point 102 to acknowledge receipt of the probe response 810.

Alternatively, when a significant update occurs, the access point 102 may schedule a probe response frame for each station that is known to be in a power save mode during which the station does not receive beacons (i.e., a deep sleep mode). A particular station may indicate to the access point 102 that it is in a deep sleep mode. For example, the access point 102 may buffer a probe response frame for the particular station when a critical update occurred. To illustrate, the station 106 may send the second PS-Poll frame 822 to the access point 102 to check for the presence of buffered data at the access point 102. The access point 102 may respond with the fourth ACK frame 824. The fourth ACK frame 824 may indicate that data is buffered with a more data bit value="1". Alternatively, a value of "0" in the more data bit may indicate that data is buffered. The station 106 may stay awake until it receives a frame from the access point 102 indicating that no further data is buffered at the access point 102. For example, end of service period (EOSP) signaling may be used to indicate that no further data is buffered at the access point 102 and that the station 106 can go back to a sleep state. For example, an EOSP bit having a value of "1" may be included in a media access control (MAC) header of the second probe response frame 826, indicating that no further data is buffered at the access point 102. After receiving the second probe response frame 826 from the access point 102, the station 106 may send the fifth ACK frame 828 to the access point 102 to acknowledge receipt of the second probe response frame 826.

The second probe response frame 826 may be encapsulated in a data frame so that an EOSP field is present. The second probe response frame 826 may be transmitted using a quality of service (QoS) management frame that includes an EOSP field.

Thus, as described with reference to FIGS. 6-8, when no traffic is buffered at the access point (AP) destined for the station (STA), the AP responds to the PS-Poll frame with a short frame that indicates that no data is currently pending for the STA. The response frame could be an ACK frame in which the MD bit is defined to indicate whether traffic is buffered (1) for the STA or not (0).

The signaling of the MD bit may be reversed to let '1' indicate that no traffic is buffered and '0' that traffic may be buffered, which allows that the feature is implemented with very little changes to the existing implementation (in which the STA would stay awake after receiving an ACK frame with MD=0 in response to a PS-Poll frame).

The ACK frame is sent SIFS after the PS-Poll frame. This time is typically too short for an AP to fetch buffered traffic, but a check whether traffic buffered is likely easy to meet the timing schedule. Information about the presence of buffered traffic is already broadcast by the AP in the traffic indication map (TIM), and the information from the TIM can be buffered at a low layer in the medium access coordinator where a quick check can be performed whether traffic is pending for a STA or not. As illustrated in FIG. 6, the STA periodically sends a PS-Poll to the AP to check the presence of buffered traffic. When no traffic is buffered for the STA at the AP, the AP responds with an ACK frame in which the MD bit indicates that no data is buffered for the STA.

Alternatively, other bits or fields in the MAC header of a response frame may be used to indicate the presence of buffered traffic. When traffic is buffered at the AP, the ACK frame from the AP will indicate that by setting the MD field to 1, effectively starting a service period. In this case, the STA stays awake until it receives from the AP a frame with the EOSP bit set to 1. The service period may effectively start after a defined fetch time on behalf of the AP, during which the AP fetches the buffered data and during which the STA may enter a sleep mode. The AP will send no data to the STA during the fetch time. As illustrated in FIG. 7, the STA periodically sends a PS-Poll to the AP to check the presence of buffered traffic. When traffic is buffered for the STA at the AP, the AP responds with an ACK frame in which the MD bit indicates that data is buffered for the STA, followed by the data. The AP sets the EOSP field to 1 when the final data frame is sent to the STA, ending the service period.

The ACK response frame from the AP may include a beacon version number (BVN) that is used by the STA to determine whether it should wake up to receive a beacon or to solicit a probe response by sending a probe request to the AP.

As illustrated in FIG. 8, the STA notes that the beacon version number (BVN) has been updated, after which the STA solicits a probe response frame by sending a probe request frame to the AP.

The AP updates the beacon version number when a significant change occurs in the beacon which needs to be parsed by all STAs in the BSS. Such a change may include a change to the channel access parameters through the EDCA Parameter Set or a change in the operating bandwidth at the AP.

Alternatively, when a significant update occurs, AP may schedule a probe response frame for each STA that is known to be in a power save mode during which the STA does not receive beacons (i.e. a deep sleep mode). A STA may indicate to the AP that it is in a deep sleep mode.

The buffered probe response frame may be encapsulated in a data frame so that an EOSP field is present. The buffered probe response frame may be transmitted using a QoS management frame that includes an EOSP field.

For IEEE 802.11ah associations, the more data (MD) field in management frames (e.g., the MD field of the frames 604, 608, 612 of FIG. 6, the MD field of the frames 704, 708, and 712 of FIG. 7, or the MD field of the frame 824 of FIG. 8) may function as an end of service period (EOSP) field. For example, a PS-Poll frame may start an unscheduled asynchronous power save delivery (U-APSD) service period, which may terminate responsive to a frame with the EOSP field set to 1 (e.g., as illustrated by the frame 206 of FIG. 2, the frame 310 of FIG. 3, the frame 510 of FIG. 5, the frame 706 of FIG. 7, and the frame 826 of FIG. 8). Thus, a legacy interpretation in which a PS-Poll frame triggers the transmission of a single frame may not be present for IEEE 802.11ah associations.

It will thus be appreciated that various embodiments described herein may reduce inefficient use of resources by preventing sleep mode in certain conditions and forcing recognition of sleep mode in other conditions. For example, when a STA indicates an upcoming transition to sleep mode, the STA may be prevented from entering the sleep mode until any previously buffered traffic is delivered to the STA and/or until the STA receives an indication from an AP that no buffered traffic exists for the STA. In addition, by waiting for a delivery condition to be satisfied (e.g., a fetch time to elapse or a delivery trigger frame to be received) before transmitting data to the STA, the AP may reduce or minimize retransmissions. It will also be appreciated that in contrast to other power save methods, embodiments described herein may enable a STA to wake up as desired instead of in accordance with a predetermined schedule that is shared between the STA and an AP.

Figure 9:
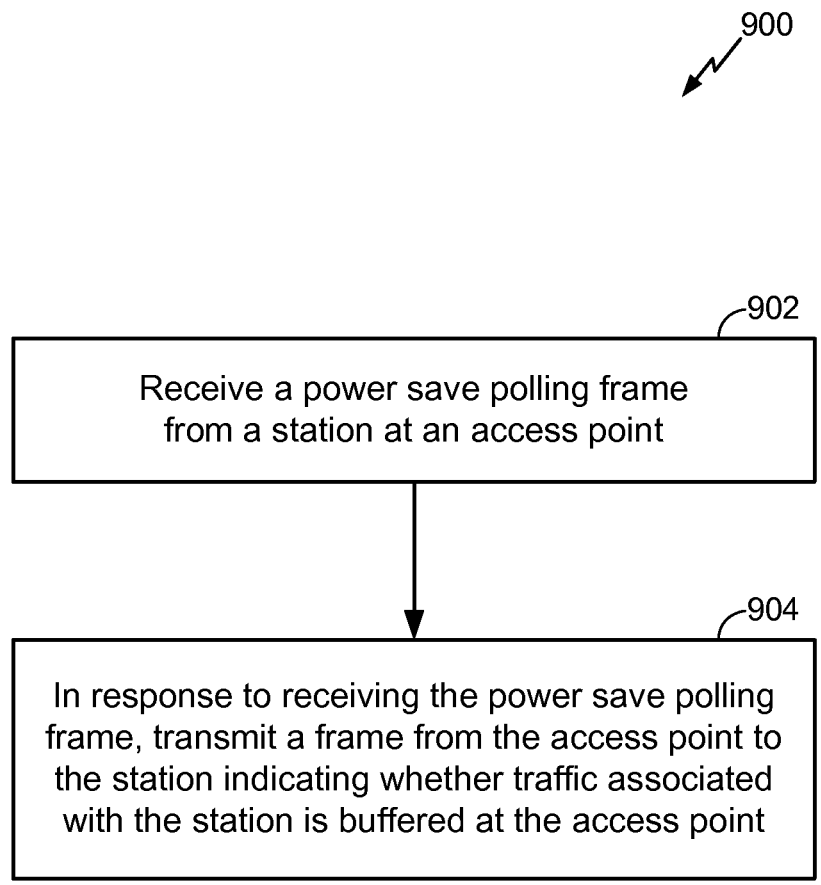
FIG. 9 is a flow diagram of a first illustrative embodiment of a method of communication between a station and an access point.

Referring to FIG. 9, a particular illustrative embodiment of a method of communication between a station and an access point is depicted and generally designated 900. The method 900 may be performed by an access point, such as the access point 102 of FIG. 1.

The method 900 includes receiving a power save polling (PS-Poll) frame from a station at an access point, at 902. For example, in FIG. 6, the PS-Poll frame 602 may be received by an access point. The method 900 also includes, in response to receiving the PS-Poll frame, transmitting a frame from the access point to the station indicating whether traffic associated with the station is buffered at the access point, at 904. In a particular embodiment, a more data (MD) bit of an acknowledgement (ACK) frame may be used to represent the indication. For example, in FIG. 6, the ACK frame 604 including the MD bit=0 may be transmitted from the access point to the station. The method 900 of FIG. 9 may be performed multiple times during operation of the station and the access point. For example, additional PS-Poll frames 606, 610 and ACK frames 608, 612 may be communicated between the station and the access point.

Figure 10:
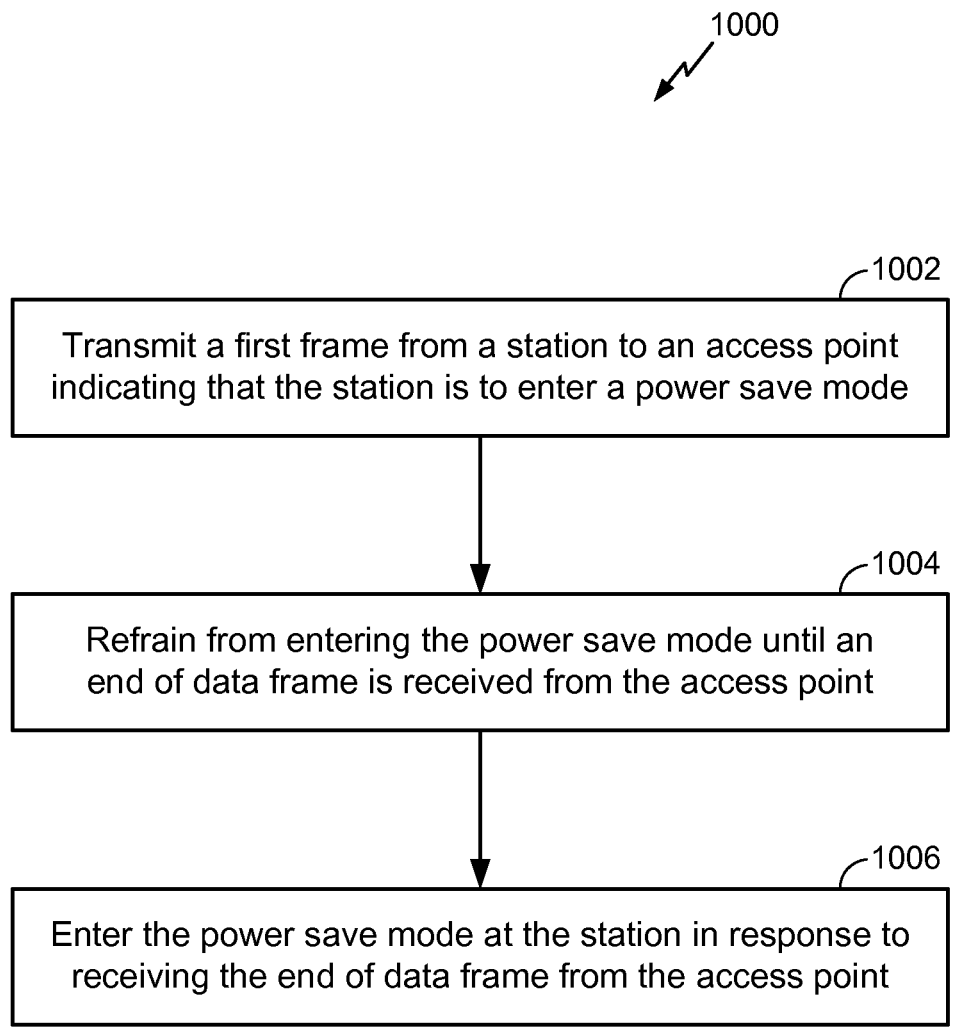
FIG. 10 is a flow diagram of a second illustrative embodiment of a method of communication between a station and an access point.

Referring to FIG. 10, a particular illustrative embodiment of a method of communication between a station and an access point is depicted and generally designated 1000. The method 1000 may be performed by a station, such as one or more of the stations 106, 108, 110 of FIG. 1.

The method 1000 includes transmitting a first frame from a station to an access point indicating that the station is to enter a power save mode, at 1002. For example, referring to FIGS. 4-5, the station may transmit the power management (PM) frame 402 of FIG. 4 or the PM frame 502 of FIG. 5.

The method 1000 also includes refraining from entering the power save mode until an end of data frame is received from the access point, at 1004, and entering the power save mode at the station in response to receiving the end of data frame from the access point, at 1006. For example, the end of data frame may be the EODI frame, such as the EODI frame 410 of FIG. 4. Alternately, the end of data frame may include an asserted EOSP bit, as illustrated by the frame 510 of FIG. 5. Refraining from entering the power save mode until the EODI frame or asserted EOSP bit is received may reduce the number of data frames that are re-fetched and re-buffered, which may reduce power consumption at the access point and the station and increase throughput between the access point and the station.

Figure 11:
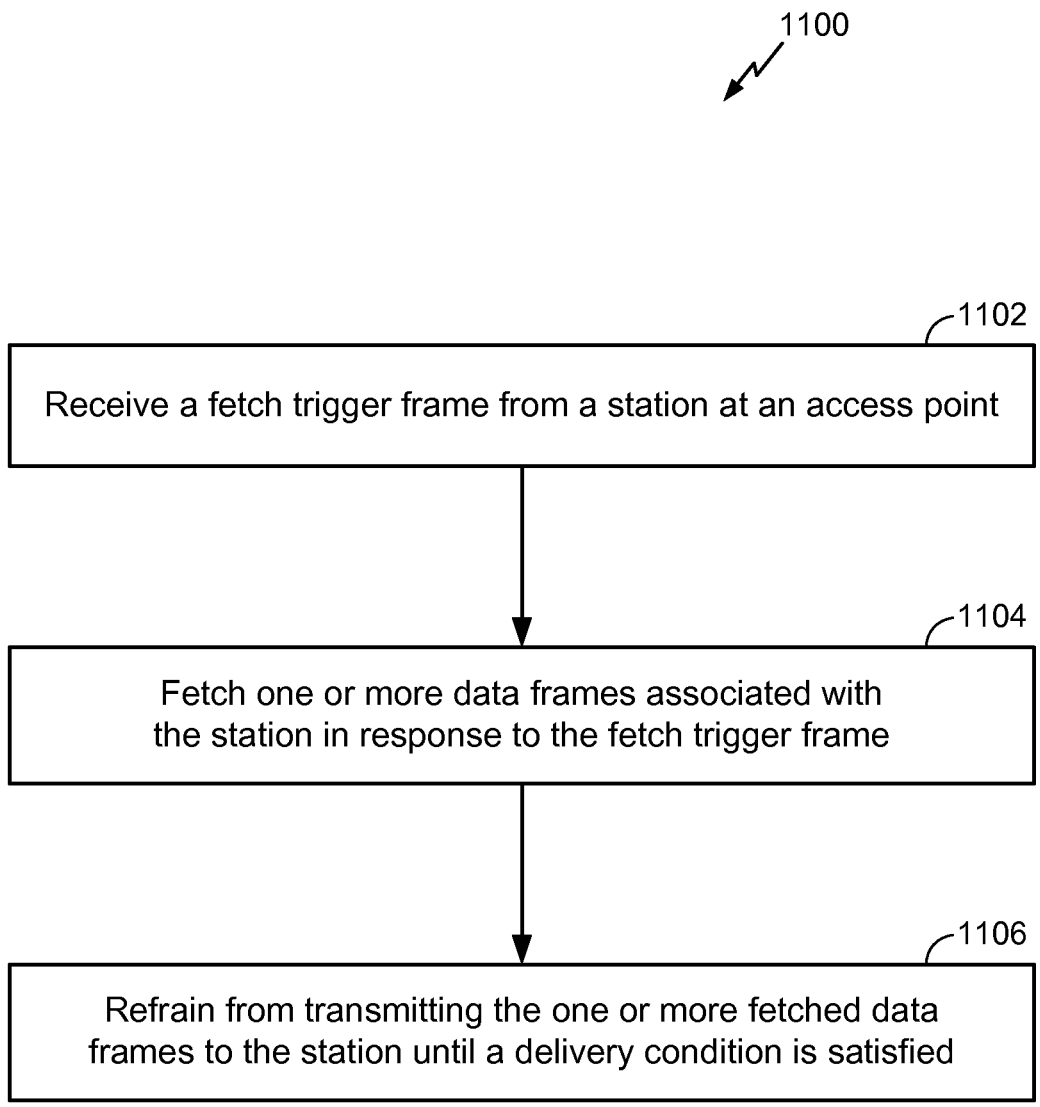
FIG. 11 is a flow diagram of a third illustrative embodiment of a method of communication between a station and an access point.

Referring to FIG. 11, a particular illustrative embodiment of a method of communication between a station and an access point is depicted and generally designated 1100. The method 1100 may be performed by an access point, such as the access point 102 of FIG. 1.

The method 1100 includes receiving a fetch trigger frame from a station at an access point, at 1102. For example, referring to FIGS. 2-3, the fetch trigger frame 202 of FIG. 2 or the fetch trigger frame 302 of FIG. 3 may be received at an access point.

The method 1100 also includes fetching one or more data frames associated with the station in response to the fetch trigger frame, at 1104. For example, referring to FIGS. 2-3, the data frame 206 of FIG. 2 or the data frame 310 of FIG. 3 may be fetched (i.e., prepared for delivery) by the access point.

The method 1100 further includes refraining from transmitting the one or more fetched data frames to the station until a delivery condition is satisfied, at 1106. For example, the delivery condition may be satisfied when a predetermined time period, such as the fetch time 210 of FIG. 2 (during which the station may enter a power save mode) has elapsed. Alternately, the delivery condition may be satisfied when a delivery trigger frame is received from the station, such as the delivery trigger frame 306 of FIG. 3. Refraining from transmitting the data frames until the delivery condition is satisfied may prevent the access point transmitting data to the station while the station is in a power save mode (e.g. asleep).

Figure 12:
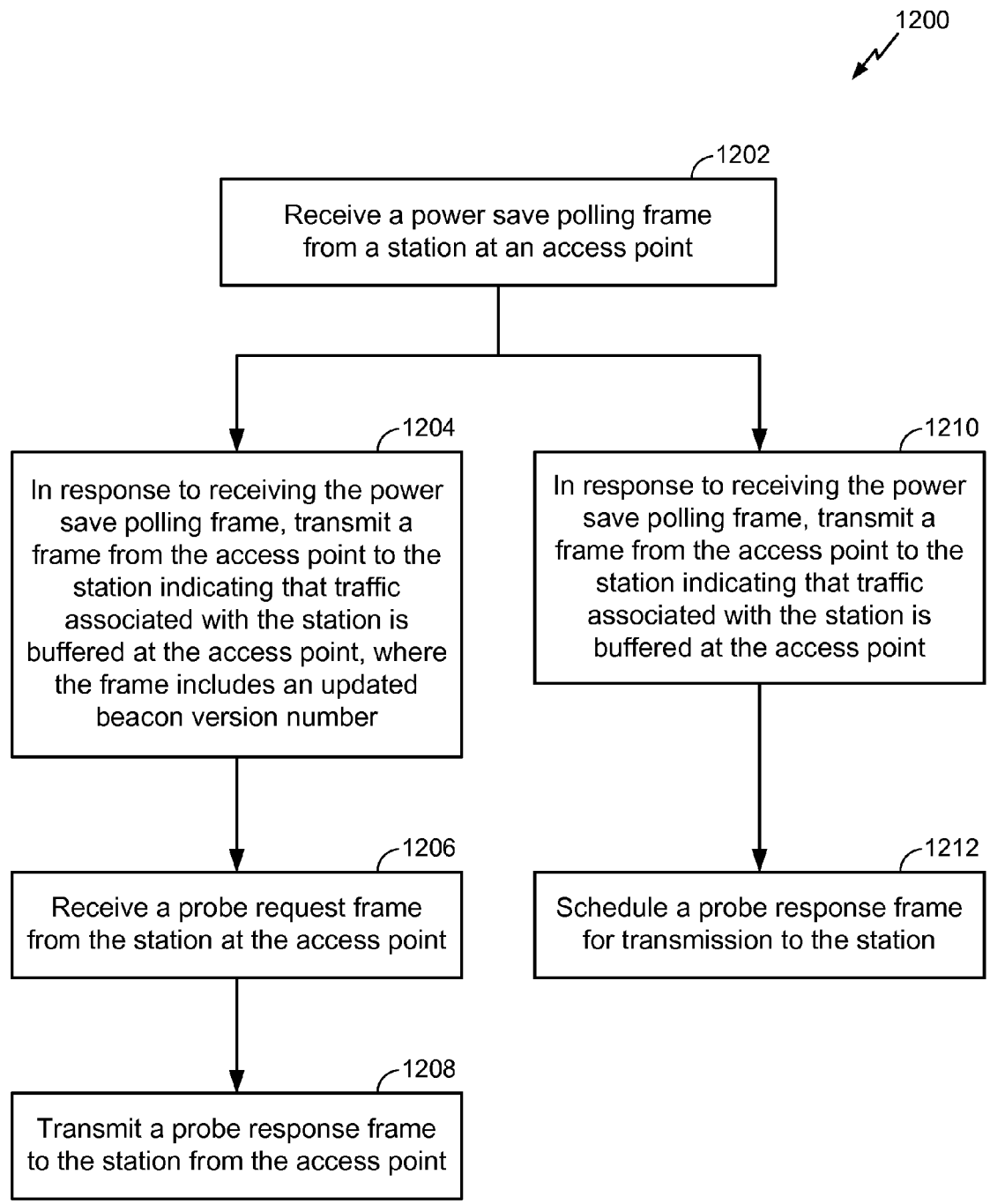
FIG. 12 is a flow diagram of a fourth illustrative embodiment of a method of communication between a station and an access point.

Referring to FIG. 12, a particular illustrative embodiment of a method of communication between a station and an access point is depicted and generally designated 1200. The method 1200 may be performed by an access point, such as the access point 102 of FIG. 1.

The method 1200 includes receiving a power save polling (PS-Poll) frame from a station at an access point, at 1202. For example, in FIG. 7, the PS-Poll frame 702 may be received by an access point. In a particular embodiment, the method 1200 may include, in response to receiving the PS-Poll frame, transmitting a frame from the access point to the station indicating that traffic associated with the station is buffered at the access point, at 1204. For example, the frame may include an updated beacon version number and may be sent to prevent the station from sleeping before receiving the updated beacon version number. To illustrate, the frame with the updated beacon version number may be the frame 804 of FIG. 8. The method 1200 may further include receiving a probe request frame from the station at the access point, at 1206, and transmitting a probe response frame to the station from the access point, at 1208. For example, the probe request frame may be the probe request frame 806 of FIG. 8 and the probe response frame may be the probe response frame 810 of FIG. 8.

In an alternate embodiment, the method 1200 may include scheduling a probe response frame for stations that are known to be in power save mode (e.g., sleeping). The scheduled probe response frame may be transmitted using a quality of service (QoS) management frame having an EOSP bit=1. For example, the method 1200 may include transmitting a frame from the access point to the station indicating that traffic associated with the station is buffered (to prevent the station from sleeping), at 1210, and scheduling a probe response frame for transmission to the station, at 1212. To illustrate, the probe response frame may be the probe response frame 826 of FIG. 8, having the EOSP bit=1.

The methods of FIGS. 9-12 may thus reduce power consumption and increase signaling efficiency between stations and access points in a wireless network. The methods of FIGS. 9-12 may also reduce the number of packets that are re-fetched and re-buffered, which may increase throughput of the wireless network.

Figure 13:
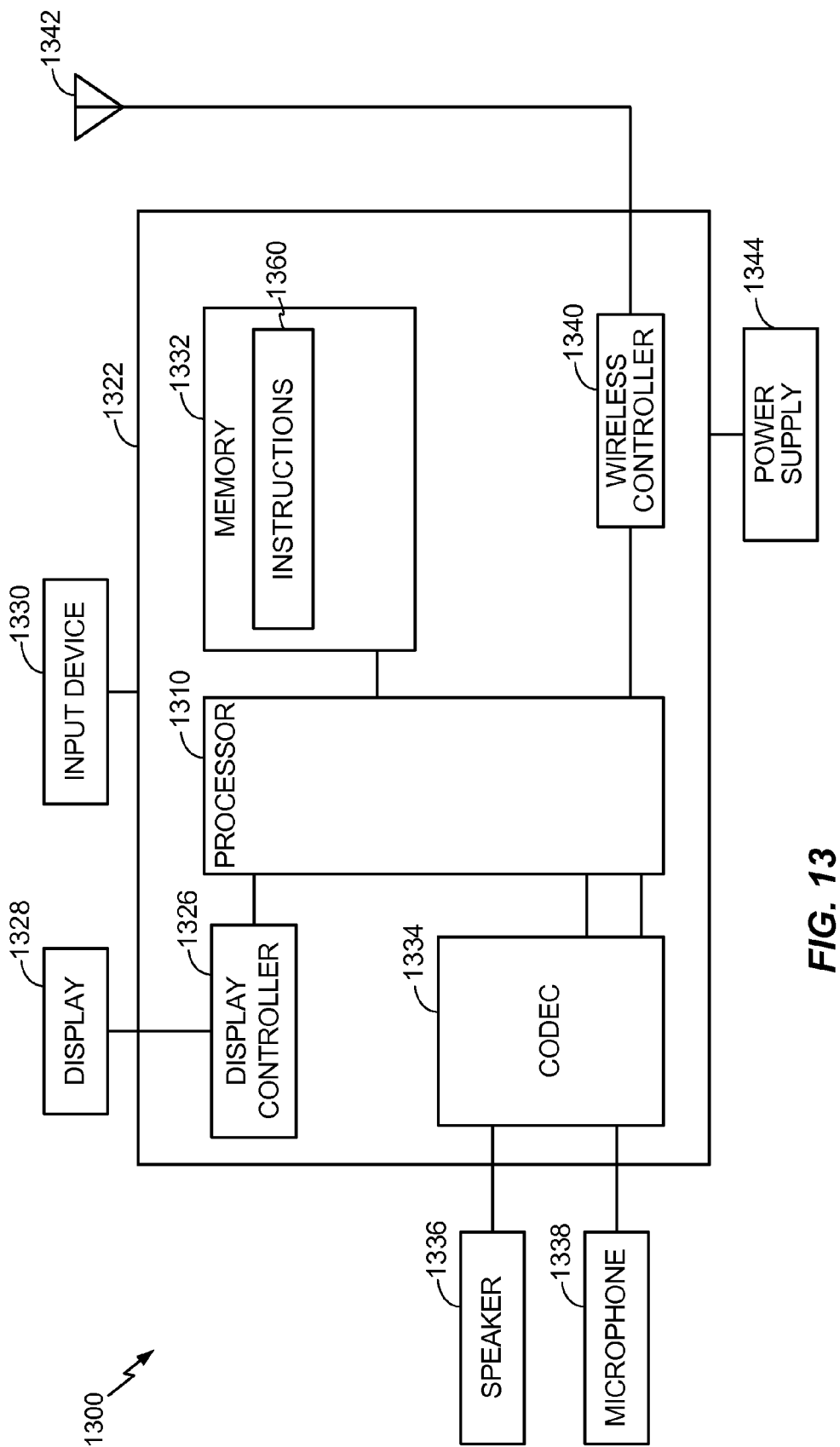
FIG. 13 is a block diagram of a wireless device operable to enter a power saving mode.

Referring to FIG. 13, a block diagram of a particular illustrative embodiment of a wireless electronic device is depicted and generally designated 1300. In an illustrative embodiment, one or more components of the wireless electronic device 1300 may be included in an access point (e.g., the access point 102 of FIG. 1) or a station (e.g., the stations 106-110 of FIG. 1). All or part of the one or more of methods described in FIGS. 9-12 may be performed at the wireless electronic device 1300 of FIG. 13. The wireless electronic device 1300 includes a processor 1310, such as a digital signal processor (DSP), coupled to a memory 1332.

The memory 1332 is a non-transitory tangible computer readable storage medium that stores instructions 1360. The instructions 1360 may be executable by the processor 1310. For example, the instructions 1360 may include instructions to initiate, control, and/or perform one or more of the methods or functions described herein, such as the methods 900-1200 of FIGS. 9-12 and/or variations or portions thereof. In a particular embodiment, the memory 1332 stores PS-Poll frames, Power Management frames, fetch trigger frames and/or delivery trigger frames or messages, as described with reference to FIGS. 2-6. Alternatively, the frames or messages may be stored at the network and retrieved in response to receiving a request for buffered data from the wireless electronic device 1300. For example, the wireless electronic device 1300 may be any of the stations 106-110 (or a component of any station) of FIG. 1.

FIG. 13 also shows a display controller 1326 that is coupled to the processor 1310 and to a display device 1328. A coder/decoder (CODEC) 1334 can also be coupled to the processor 1310. A speaker 1336 and a microphone 1338 can be coupled to the CODEC 1334. FIG. 13 also indicates that a wireless controller 1340 can be coupled to the processor 1310 and to a wireless antenna 1342. In a particular embodiment, the processor 1310, the display controller 1326, the memory 1332, the CODEC 1334, and the wireless controller 1340 are included in a system-in-package or system-on-chip device 1322. In a particular embodiment, an input device 1330 and a power supply 1344 are coupled to the system-on-chip device 1322. Moreover, in a particular embodiment, as illustrated in FIG. 13, the display device 1328, the input device 1330, the speaker 1336, the microphone 1338, the wireless antenna 1342, and the power supply 1344 are external to the system-on-chip device 1322. However, each of the display device 1328, the input device 1330, the speaker 1336, the microphone 1338, the wireless antenna 1342, and the power supply 1344 can be coupled to a component of the system-on-chip device 1322, such as an interface or a controller.

In conjunction with the described embodiments, a first apparatus includes means for receiving a fetch trigger frame from a station at an access point. For example, the means for receiving may include the processor 1310, the wireless controller 1340, the wireless antenna 1342, one or more other devices configured to receive data, or any combination thereof. The apparatus also includes means for fetching, in response to the fetch trigger frame, one or more data frames associated with the station. For example, the means for fetching may include the processor 1310, the memory 1332, one or more other devices configured to fetch data, or any combination thereof. The apparatus further includes means for refraining from transmitting the one or more fetched data frames to the station until determining at the access point that a fetch time associated with the station has elapsed or until a delivery trigger frame is received from the station. The access point is configured to communicate with one or more other stations during the fetch time. For example, the means for refraining may include the processor 1310, the wireless controller 1340, one or more other devices configured to refrain from transmitting data, or any combination thereof.

A second apparatus includes means for transmitting a fetch trigger frame from a station to an access point. For example, the means for transmitting may include the processor 1310, the wireless controller 1340, the wireless antenna 1342, one or more other devices configured to transmit data, or any combination thereof. The apparatus also includes means for entering a power save mode at the station until a determination at the station that a fetch time associated with the station has elapsed and for exiting the power save mode in response to the determination. The access point is configured to communicate with one or more other stations during the fetch time. For example, the means for entering and for exiting may include the processor 1310, the wireless controller 1340, one or more other devices configured to enter and exit power save mode, or any combination thereof. The apparatus further includes means for receiving one or more data frames from the access point at the station after exiting the power save mode. For example, the means for receiving may include the processor 1310, the wireless controller 1340, the wireless antenna 1342, one or more other devices configured to receive data, or any combination thereof.

A third apparatus includes means for receiving a first frame from a station at an access point, the first frame indicating that the station is to enter a power save mode. For example, the means for receiving may include the processor 1310, the wireless controller 1340, the wireless antenna 1342, one or more other devices configured to receive data, or any combination thereof. The apparatus also includes means for transmitting one or more data frames and an end of data frame from the access point to the station. The one or more data frames were buffered for transmission prior to receipt of the first frame. For example, the means for transmitting may include the processor 1310, the wireless controller 1340, the wireless antenna 1342, one or more other devices configured to transmit data, or any combination thereof.

A fourth apparatus includes means for transmitting a first frame from a station to an access point, the first frame indicating that the station is to enter a power save mode. For example, the means for transmitting may include the processor 1310, the wireless controller 1340, the wireless antenna 1342, one or more other devices configured to transmit data, or any combination thereof. The apparatus also includes means for refraining from entering the power save mode until an end of data frame is received from the access point. For example, the means for refraining may include the processor 1310, the wireless controller 1340, one or more other devices configured to refrain from entering power save mode, or any combination thereof. The apparatus further includes means for entering the power save mode at the station in response to receiving the end of data frame from the access point. For example, the means for entering may include the processor 1310, the wireless controller 1340, one or more other devices configured to enter a power save mode, or any combination thereof.

A fifth apparatus includes means for receiving a power save polling frame from a station at an access point. For example, the means for receiving may include the processor 1310, the wireless controller 1340, the wireless antenna 1342, one or more other devices configured to receive data, or any combination thereof. The apparatus also includes means for transmitting, in response to receipt of the power save polling frame, a frame from the access point to the station. The frame indicates whether traffic associated with the station is buffered at the access point. For example, the means for transmitting may include the processor 1310, the wireless controller 1340, the wireless antenna 1342, one or more other devices configured to transmit data, or any combination thereof.

A sixth apparatus includes means for transmitting a power save polling frame from a station to an access point. For example, the means for transmitting may include the processor 1310, the wireless controller 1340, the wireless antenna 1342, one or more other devices configured to transmit data, or any combination thereof. The apparatus also includes means for receiving, in response to transmitting the power save polling frame, a frame from the access point indicating whether traffic associated with the station is buffered at the access point. For example, the means for receiving may include the processor 1310, the wireless controller 1340, the wireless antenna 1342, one or more other devices configured to receive data, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
    transmitting a fetch trigger frame from a station to an access point;
    entering a power save mode at the station until a determination at the station that a fetch time associated with the station has elapsed, wherein the access point is configured to communicate with one or more other stations during the fetch time; and
    in response to the determination, exiting the power save mode and receiving one or more data frames from the access point at the station after exiting the power save mode;
    wherein, in response to the fetch trigger frame, the station receives from the access point a particular frame that includes a beacon version number.

2. The method of claim 1, wherein the fetch time is indicated in the fetch trigger frame.

3. The method of claim 2, wherein the fetch time is indicated in an acknowledgement frame received in response to the fetch trigger frame or in a beacon frame.

4. The method of claim 1, wherein the fetch trigger frame comprises a power save poll (PS-Poll) frame or an unscheduled asynchronous power save delivery (U-APSD) frame.

5. The method of claim 1, further comprising, in response to the determination that the fetch time has elapsed, transmitting a delivery trigger frame to the access point and refraining from re-entering the power save mode until one or more data frames are received from the access point responsive to the delivery trigger frame.

6. The method of claim 1, wherein the access point is configured to transmit the one or more data frames responsive to the fetch trigger frame.

7. The method of claim 1, wherein at least one of the one or more data frames is an end of data frame.

8. The method of claim 1, wherein at least one of the one or more data frames indicates an end of service period.

9. The method of claim 1, wherein the one or more data frames includes the beacon version number.

10. An apparatus comprising:
    a processor; and
    a memory storing instructions executable by the processor to perform operations comprising:

transmitting a fetch trigger frame from a station to an access point;

entering a power save mode at the station until a determination at the station that a fetch time associated with the station has elapsed, wherein the access point is configured to communicate with one or more other stations during the fetch time; and in response to the determination, exiting the power save mode and receiving one or more data frames from the access point at the station after exiting the power save mode;

wherein the operations comprise receiving from the access point, in response to the fetch trigger frame, a particular frame that includes a beacon version number.

11. The apparatus of claim 10, wherein the fetch time is indicated in the fetch trigger frame.

12. The apparatus of claim 10, wherein the fetch time is indicated in an acknowledgement frame received in response to the fetch trigger frame or in a beacon frame.

13. The apparatus of claim 10, wherein the fetch trigger frame comprises a power save poll (PS-Poll) frame or an unscheduled asynchronous power save delivery (U-APSD) frame.

14. The apparatus of claim 10, wherein the instructions are further executable by the processor to, in response to the determination that the fetch time has elapsed, transmit a delivery trigger frame to the access point and refrain from re-entering the power save mode until one or more data frames are received from the access point responsive to the delivery trigger frame.

15. A non-transitory computer-readable medium comprising instructions that, when executed by a computer, cause the computer to perform operations comprising:

transmitting a fetch trigger frame from a station to an access point;

entering a power save mode at the station until a determination at the station that a fetch time associated with the station has elapsed, wherein the access point is configured to communicate with one or more other stations during the fetch time; and in response to the determination, exiting the power save mode and receiving one or more data frames from the access point at the station after exiting the power save mode;

wherein the operations comprise receiving from the access point, in response to the fetch trigger frame, a particular frame that includes a beacon version number.

16. The non-transitory computer-readable medium of claim 15, wherein the fetch trigger frame comprises a power save poll (PS-Poll) frame or an unscheduled asynchronous power save delivery (U-APSD) frame.

17. The non-transitory computer-readable medium of claim 15, wherein the instructions, when executed by the computer, further cause the computer to, in response to the determination that the fetch time has elapsed, transmit a delivery trigger frame to the access point and refrain from re-entering the power save mode until one or more data frames are received from the access point responsive to the delivery trigger frame.

18. An apparatus comprising:

means for transmitting a fetch trigger frame from a station to an access point;

means for entering a power save mode at the station until a determination at the station that a fetch time associated with the station has elapsed and for exiting the power save mode in response to the determination, wherein the access point is configured to communicate with one or more other stations during the fetch time; and means for receiving one or more data frames from the access point at the station after exiting the power save mode;

wherein the means for receiving is configured to receive from the access point, in response to the fetch trigger frame, a particular frame that includes a beacon version number.

19. The apparatus of claim 18, wherein the fetch time is indicated in the fetch trigger frame.

20. The apparatus of claim 18, wherein the fetch time is indicated in an acknowledgement frame received in response to the fetch trigger frame or in a beacon frame.

* * * * *